United States Patent [19]

Engelke

[11] 4,453,419

[45] Jun. 12, 1984

[54] DEVICE FOR SENSING THE VOLMETRIC FLOW RATE OF AIR IN A DUCT

[75] Inventor: Roger P. Engelke, Roscoe, Ill.

[73] Assignee: Barber-Colman Company, Rockford, Ill.

[21] Appl. No.: 444,788

[22] Filed: Nov. 26, 1982

[51] Int. Cl.$^3$ ............................................... G01F 1/46
[52] U.S. Cl. .................................................. 73/861.66
[58] Field of Search ......................... 73/861.66, 863.58

[56] References Cited

U.S. PATENT DOCUMENTS

| | | |
|---|---|---|
| 1,250,238 | 12/1917 | Spitzglass . |
| 3,685,355 | 8/1972 | DeBaun ................ 73/212 |
| 4,154,100 | 5/1979 | Harbaugh et al. .......... 73/212 |
| 4,344,330 | 8/1982 | Renken et al. .......... 73/861.66 |
| 4,372,171 | 2/1983 | Brandt, Jr. ............. 73/861.66 |

OTHER PUBLICATIONS

Cambridge Filter Corporation, Bulletin No.1115A (12 pages).
Annular Flow Measurement (8 pages).
Air System Flow Measurement Points (4 pages).
Airbar Test Results (5 pages).

Primary Examiner—S. Clement Swisher
Assistant Examiner—Brian R. Tumm
Attorney, Agent, or Firm—Leydig, Voit, Osann, Mayer & Holt, Ltd.

[57] ABSTRACT

A sensor in an air conditioning duct produces a differential pressure signal which varies as a function of the volumetric flow rate of air through the duct. The sensor includes an array of angularly spaced and radially extending arms disposed around and across the duct and each having upstream and downstream sensing tubes formed with ports spaced along their upstream and downstream sides, respectively. Pressure signals are transmitted to the tubes by way of the ports and are averaged by high and low pressure averaging chambers located at the center of the sensor and communicating with the upstream and downstream sensing tubes, respectively. The output signals from the averaging chambers constitute a differential pressure signal which is highly representative of the volumetric flow rate of the air even though the air flows through the duct in an asymmetrical pattern.

11 Claims, 8 Drawing Figures

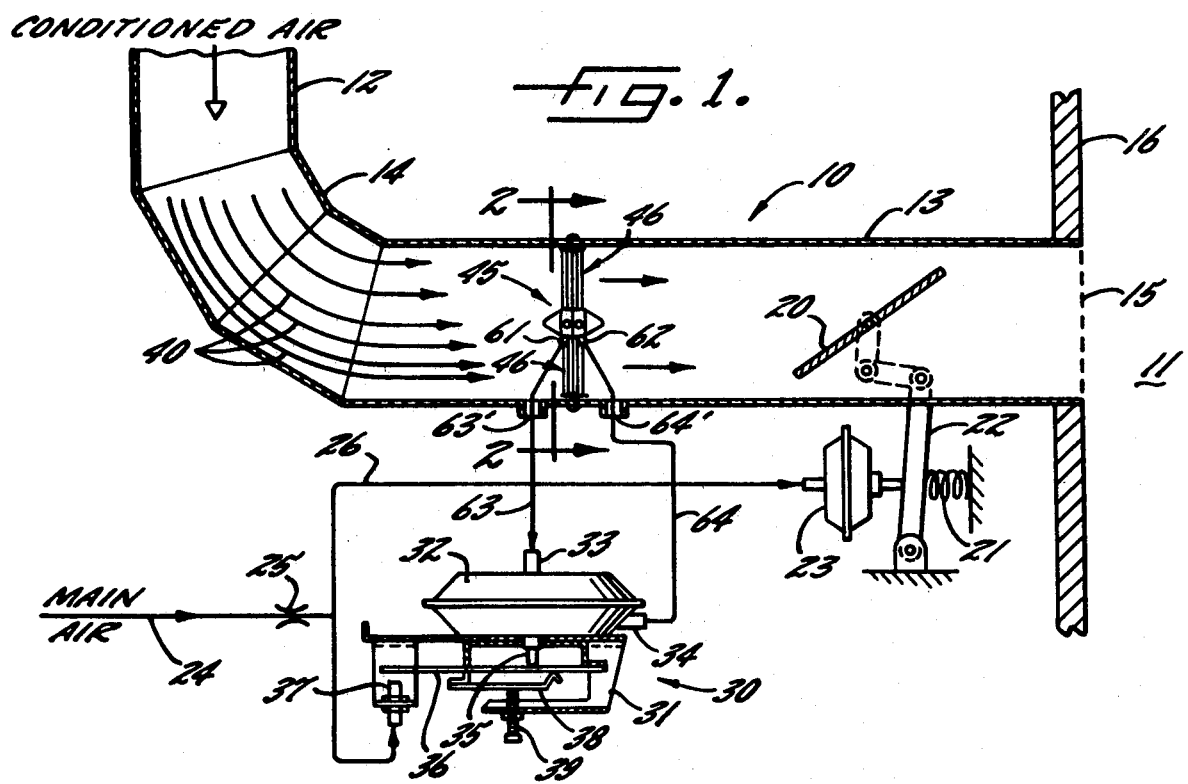
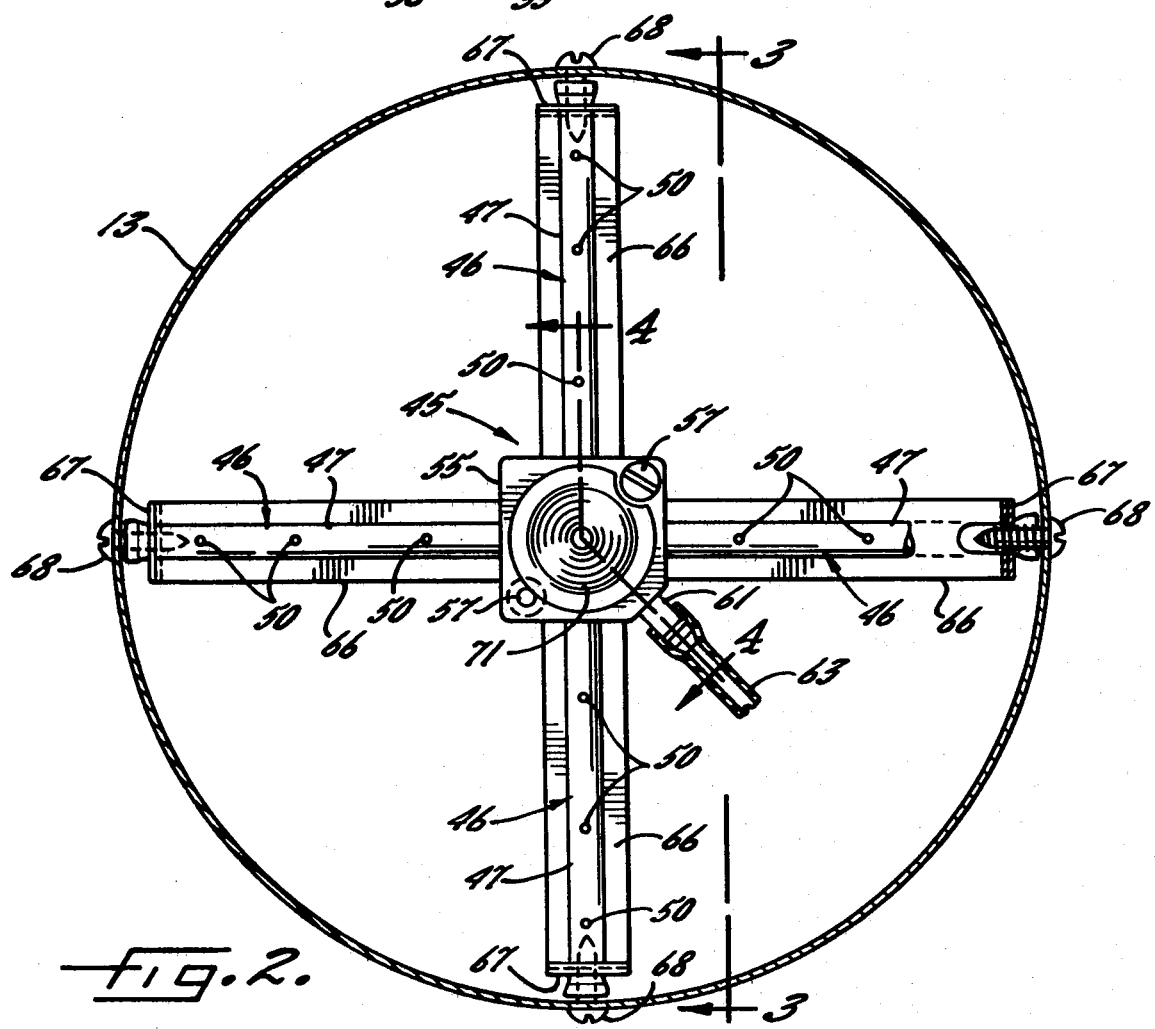

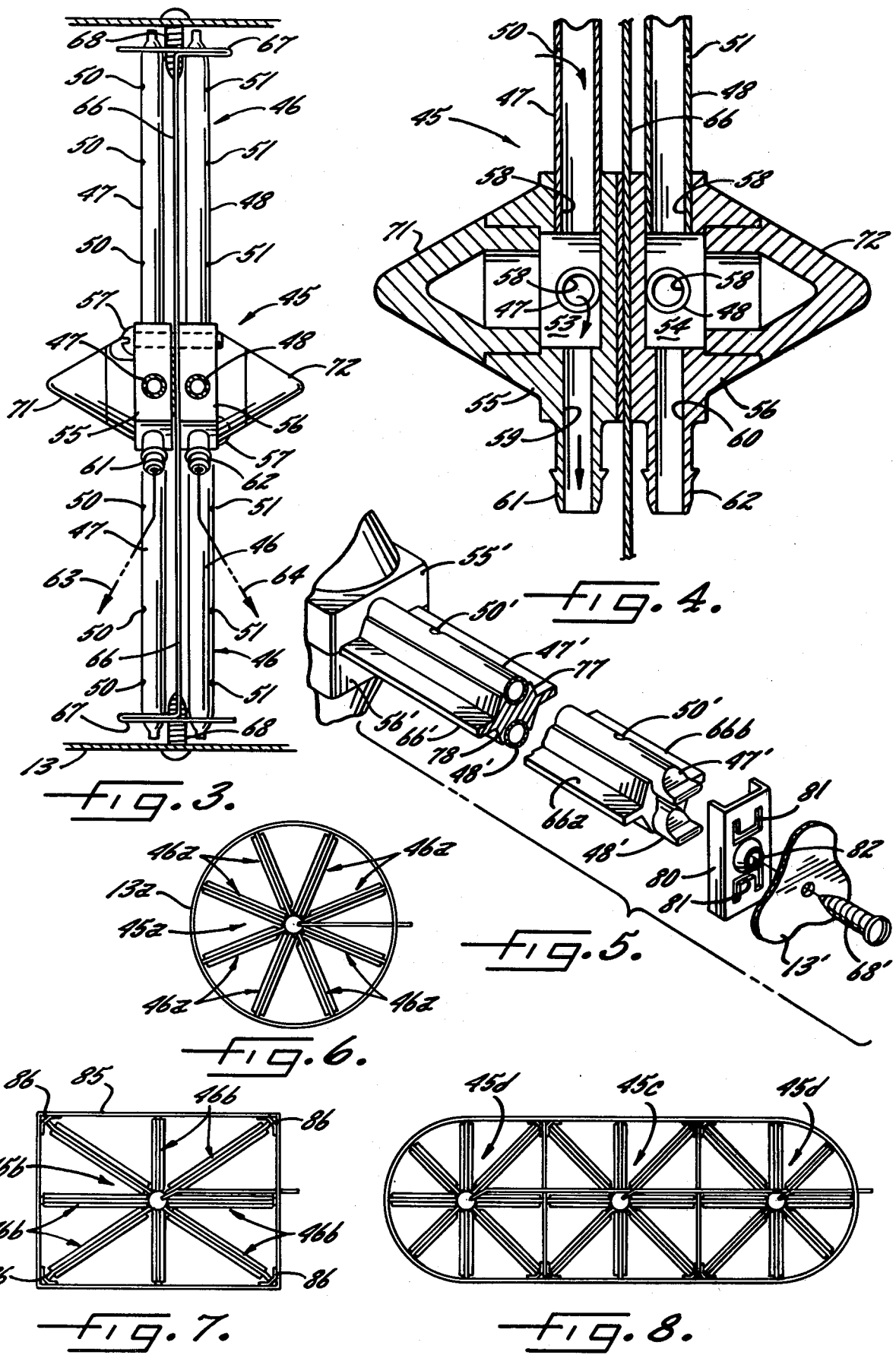

DEVICE FOR SENSING THE VOLMETRIC FLOW RATE OF AIR IN A DUCT

BACKGROUND OF THE INVENTION

This invention relates to a sensor for producing a differential pressure signal which varies as a function of the volumetric flow rate of air through a duct system.

The sensor may, for example, be installed in the air conditioning duct system of a building and may be associated with a controller for regulating the volumetric flow of air through the duct system. The differential pressure output signal of the sensor is representative of the actual volumetric flow rate through the duct system and is transmitted to the controller for comparison with a signal representative of the desired volumetric flow. When the actual flow does not correspond to the desired flow, the controller automatically adjusts a damper or the like in the duct in order to establish the actual flow at the desired rate. The accuracy of the controller is dependent to a large degree upon the accuracy with which the sensor transmits a pressure differential signal that is representative of the actual flow rate.

In many building duct systems, the differential pressure sensor is formed in part by a conventional orifice located in the duct. High and low pressure taps are located upstream and downstream, respectively, of the orifice and transmit a differential pressure signal as air flows past the orifice and undergoes a pressure drop. In order for the differential pressure signal produced across the orifice to accurately represent the actual volumetric flow, it is necessary that a substantially symmetrical flow pattern exist at the orifice. Frequently, the orifice is located in a downstream duct section which extends at an angle to a connecting upstream duct section such that air curves into the downstream duct section and flows in an asymmetrical pattern through the entrance thereof. Under such circumstances, it is necessary either to space the orifice a considerable distance (e.g., four duct diameters) from the entrance of the duct or to use an air straightening core or the like upstream of the orifice in order to establish a symmetrical flow pattern through the orifice. In some duct systems, the downstream duct section simply is too short to permit the orifice to be spaced the required distance from the duct entrance. It thus becomes necessary to use an air straightening device in conjunction with the orifice and such use increases the material and labor costs of the overall installation.

SUMMARY OF THE INVENTION

The general aim of the present invention is to provide a new and improved differential pressure sensor which, while being of relatively simple and inexpensive construction, is capable of producing a signal which accurately represents the volumetric flow rate of air flowing in an asymmetrical pattern through a duct system.

A related object of the invention is to provide a sensor which eliminates the need for upstream air straightening devices and which is capable of producing an accurate signal when located only a short distance downstream of the entrance end of a duct.

A more detailed object is to achieve the foregoing by providing a sensor having an array of sensing tubes which are dispersed around and across the duct in order to detect the pressures in different areas of the asymmetrical flow pattern, the sensor being capable of averaging the various pressures and producing a differential pressure signal which is a highly accurate representation of the volumetric flow.

Still another object of the invention is to provide a sensor having novel sharp-edged blades for shaping the flow of air past the sensing tubes in order to improve the accuracy of the sensor. In one embodiment of the invention, the blades may be easily formed of different widths and may be easily adapted for use with tubes of different lengths.

The invention also resides in the construction enabling the sensor to be adapted for use in ducts of various sizes and shapes.

These and other objects and advantages of the invention will become more apparent from the following detailed description when taken in conjunction with the accompanying drawings.

BRIEF DESCRIPTION OF THE DRAWINGS

FIG. 1 is a schematic view which shows a typical duct system equipped with a new and improved pressure differential sensor incorporating the unique features of the present invention.

FIG. 2 is an enlarged cross-section taken substantially along the line 2—2 of FIG. 1.

FIG. 3 is a fragmentary cross-section taken along the line 3—3 of FIG. 2.

FIG. 4 is an enlarged fragmentary cross-section taken substantially along the line 4—4 of FIG. 2.

FIG. 5 is an exploded perspective view of part of a modified sensor.

FIGS. 6, 7 and 8 are front elevational views of three additional embodiments of sensors incorporating the novel features of the present invention.

DETAILED DESCRIPTION OF THE PREFERRED EMBODIMENTS

For purposes of illustration, the present invention is shown in the drawings in association with a duct system 10 for delivering conditioned air into an interior space 11. The duct system includes an upstream duct section 12 which extends at a right angle to a horizontal downstream duct section 13 and which is connected to the downstream section by an elbow 14. For simplicity of illustration, FIG. 1 shows the upstream section as extending vertically although it is more conventional in actual practice for the upstream section to extend horizontally at right angles to the downstream section. The downstream section communicates with the space 11 by way of a grille 15 in a wall 16.

A damper 20 controls the volumetric rate of flow of conditioned air through the duct section 13. The damper is biased to a normally open position by a spring 21 acting through a linkage 22. Variable damper branch air pressure is supplied to a pneumatic damper actuator 23 which is positioned to oppose the bias force exerted by the spring on the linkage and which thus determines the position of the damper. Branch air is obtained from a source of compressed air supplied through a main 24. After passing through a restrictor 25, the main air becomes damper branch air in a damper branch 26 communicating with the actuator 23.

A controller 30 is associated with the actuator 23 and controls the pressure of the air in the damper branch 26 to cause the actuator to adjust the position of the damper 20. The controller 30 comprises a base 31 upon which is mounted a differential pressure-to-mechanical transducer 32. The latter includes high and low pressure ports 33 and 34 which receive high and low pressure signals from the duct section 13. The sum of those signals constitutes a differential pressure signal which varies as a function of the volumetric flow rate of air through the duct section 13. Such differential pressure signal causes the transducer 32 to produce, at a pin 35, a mechanical force which varies as a function of the volumetric flow. The pin 35 bears against a rigid flapper 36 having one end which is cantilevered on the base 31. The free end portion of the flapper is movable toward and away from a bleed nozzle 37 which communicates with the damper branch 26 to control the branch air pressure therein. The flapper is urged away from the nozzle by a leaf spring 38 cantilevered on the base 31 and having a free end portion which engages the underside of the flapper to apply a bias force in opposition to the variable force applied by the pin 35. A set screw 30 on the base 31 engages the underside of the spring 38 and may be adjusted to vary the biasing force applied by the spring to the flapper 36.

The variable position of the flapper 36 with respect to the nozzle 37 thus is established by a balance of the forces applied by the pin 35 and the spring 38. As the rate of flow of conditioned air through the duct section 13 increases, the differential pressure between the ports 33 and 34 of the transducer 32 increases, producing a greater force by the pin 35 against the flapper 36 to move the flapper closer to the nozzle 37. this causes less air to bleed through the nozzle so as to increase the pressure of the air in the damper branch 26 and increase the force applied by the damper actuator 23. Accordingly, the actuator moves the damper 20 further toward its closed position, thereby reducing the rate of flow of conditioned air through the duct 13. Conversely, a decrease in the rate of flow through the duct section 13 causes the differential pressure between the ports 33 and 34 of the transducer 32 to decrease so as to reduce the force applied to the flapper 36 by the pin 35 and to allow the spring 38 to move the flapper away from the nozzle 37. This causes more air to bleed from the nozzle, thereby decreasing the damper branch air pressure and the force applied by the damper actuator 23 so that the spring 21 may move the damper 20 to a more open position and increase the flow of air through the duct.

Accordingly, the controller 30 opens and closes the damper 20 in a manner tending to maintain a constant volumetric rate of air flow through the duct 13 even though there are increases or decreases in either the upstream supply pressure or the downstream pressure in the interior space 11. The controller may be of the reset type such as disclosed in Maxson et al U.S. Pat. No. 4,264,035 and, in such a case, the controller resets the volumetric flow rate at different values depending upon changes in one or more sensed conditions (e.g., temperature) in the space 11.

The accuracy with which the controller 30 may maintain a constant volumetric flow rate through the duct 13 or may reset the flow rate to a desired value is dependent upon the transducer 32 receiving, across its ports 33 and 34, a differential pressure signal which varies accurately as a function of the actual volumetric flow rate through the duct. As the air first enters the downstream duct section 13, it flows in an asymmetrical pattern as a result of curving around the elbow 14. In other words, the velocity pressure of the air entering the lower portion of the duct 13 tends to be higher than the velocity pressure of the air entering the upper portion of the duct as indicated schematically by the asymmetrical flow lines 40 shown in FIG. 1.

Because of the asymmetrical pattern of the air flow entering the duct section 13, difficulty has been encountered in obtaining a differential pressure signal which accurately represents the volumetric flow rate. With differential pressure sensors (e.g., orifices) of the type most commonly used in the past in air conditioning duct systems, it has been necessary to locate the sensor a considerable distance downstream of the entrance end of the duct 13 so that the sensor will be positioned in a more symmetrical flow pattern. In conventional practice, simple orifice-type sensors must be spaced downstream from the entrance end of the duct by a distance equal to at least four times the duct diameter before a reasonably accurate representation of air flow is produced. In some cases, the duct 13 is not sufficiently long to enable the sensor to be located the required distance from the entrance end of that duct and, under such circumstances, it is necessary to install an air straightening device in the duct upstream of the sensor in order to change the air flow from an asymmetrical condition to a substantially symmetrical condition before the flow encounters the sensor.

The present invention contemplates the provision of a new and improved differential pressure sensor 45 having an array of sensing elements 46 which are uniquely disposed around and across the duct 13 so as to receive pressure signals from widely distributed areas of the asymmetrical flow pattern. The sensor 45 averages the various pressure signals and produces a resultant differential pressure signal which is highly representative of the actual volumetric flow rate through the duct. Such highly representative signal is produced even though the sensor is positioned closely adjacent the entrance end of the duct and without need of installing an air straightening device upstream of the sensor.

More specifically, the sensing elements 46 of the present sensor 45 are in the form of arms which radiate outwardly from the center of the sensor. The sensor includes an array of at least three angularly spaced sensing elements or arms 46 and, in the specific embodiment shown in FIGS. 1 to 4, there are four identical arms 46 spaced ninety degrees from one another.

Each arm 46 comprises parallel upstream and downstream sensing tubes 47 and 48 (see FIG. 3) having closed outer ends and disposed in angular alinement with one another. The tubes project transversely of the duct 13 and extend from a point just short of the center of the duct to a point just short of the wall of the duct, each tube thus spanning most of the radius of the duct. Each tube preferably is cylindrical.

Formed through and spaced axially along the upstream side of each upstream sensing tube 47 is a series of holes or ports 50 (FIGS. 2, 3 and 4) which face in an upstream direction to admit high pressure components of the air stream into the upstream tubes. Similar holes or ports 51 (FIGS. 3 and 4) are formed through and are spaced along the downstream side of each downstream tube 48 and face in a downstream direction. Low pressure components of the air stream are sensed by the downstream tubes 48 via the ports 51.

Preferably but not necessarily, the spacing between the ports 50, 51 of each tube 47, 48 decreases as the ports progress outwardly along the tube. Thus, with three holes in each tube as shown in FIG. 2, the spacing between the outermost port and the center port is less than the spacing between the center port and the innermost port. If the tube were longer, additional ports would be formed outwardly of the outermost port shown in FIG. 2 with the spacing between successively outwardly located ports becoming progressively less. The irregular spacing of the ports approximates a standard Pitot tube traverse pattern and enables more accurate averaging of the pressure signals of the air stream.

In keeping with the invention, the inner ends of the four upstream sensing tubes 47 communicate with a first centrally located pressure averaging chamber 53 (FIG. 4) while the inner ends of the four downstream sensing tubes 48 communicate with a second centrally located pressure averaging chamber 54. Herein, the averaging chambers 53 and 54 are defined by the hollow interiors of two molded plastic body members or hubs 55 and 56. The two hubs are disposed in back-to-back relationship and are secured to one another by a pair of screws 57 (FIGS. 2 and 3). Each hub 55, 56 is formed with four angularly spaced and radially extending holes 58 (FIG. 4) which tightly receive the inner end portions of the respective sensing tubes 47, 48, the tubes communicating with respective averaging chambers 53, 54 by way of the holes 58. The two hubs 55 and 56 also are formed with radially extending passages 59 and 60, respectively, which lead from the chambers 53 and 54 and through external fittings 61 and 62 molded integrally with the hubs. Flexible lines 63 and 64 (FIGS. 1 to 3) extend through openings 63' and 64' of the duct section 13 and connect the fittings 61 and 62 with the high and low pressure ports 33 and 34, respectively, of the transducer 32. Thus, the upstream sensing tubes 47 communicate with the high pressure port 33 of the transducer 32 by way of the averaging chamber 53 while the downstream sensing tubes 48 communicate with the low pressure port 34 of the transducer via the averaging chamber 54.

With the foregoing arrangement, the air flowing into the ports 50 of the four upstream sensing tubes 47 creates high pressure signals which are transmitted by those tubes to the central averaging chamber 53. At the same time, the air flowing past the four downstream sensing tubes 48 produces negative or suction pressures on the downstream sides of the latter tubes. As a result of the ports 51, a negative pressure condition is created within the downstream tubes 48 and the central averaging chamber 54. The upstream pressure is approximately equal to the static pressure of the air plus the velocity pressure while the downstream pressure is approximately equal to the static pressure minus the velocity pressure.

Because the tubes 47 and 48 are spaced around the duct 13 and because the ports 50 and 51 are spaced along the tubes, the pressures existing at the various ports are highly representative of the pressures which are present in the various areas of the asymmetrical flow pattern. In other words, the ports are dispersed around and across the flow pattern so that different velocity pressures which exist in the flow pattern are detected. The pressures created in each set of four tubes are resolved into average high and low pressure signals in the averaging chambers 53 and 54. The average high and low pressure signals are highly representative of the actual volumetric flow rate and are transmitted to the transducer 32 by the lines 63 and 64 so as to enable accurate operation of the controller 30. As a result of the averaging effect provided by the tubes and the chambers, the sensor 45 may be installed as close as one duct diameter from the entrance end of the duct 13 and, without need of using any type of air straightening device, will still produce an acceptably accurate output signal.

Advantageously, means are incorporated in the arms 46 for shaping the flow of air as the air passes over the downstream sensing tubes 48. Herein, these means are in the form of four sheet metal strips or blades 66 (FIGS. 2 and 3), there being one blade associated with each arm 46. Each blade is located between and extends along the upstream and downstream tubes 47 and 48 of the arm and is disposed in a plane extending perpendicular to the direction of air flow. As shown in FIG. 2, the side edge portions of each blade extend radially of the tubes beyond the sides thereof and thus the upstream side of each downstream tube 48 is completely shielded by the blade. As the air passes the upstream tubes 47, it is deflected by the blades 66 and shaped by the edges thereof rather than flowing directly across the curved surfaces of the downstream tubes 48. The shaped air flow effected by the blades 66 enables the pressures on the downstream sides of the downstream tubes 48 to be more accurately detected.

The blades 66 also may be used to mount the sensor 45 in the duct 13. As shown in FIG. 3, the outer end portion of each blade is bent in such a manner as to form a substantially J-shaped bracket 67 at the end of the blade. The two tubes 47 and 48 of the associated arm 46 extend through holes in the bracket and thus the bracket helps stabilize the tubes. In addition, a center hole is formed through each bracket and is adapted to receive a screw 68 for securing the sensor in the duct.

The blades 66 of each pair of diametrically alined arms 46 are formed integrally with one another and also are formed integrally with a central mounting plate. The two mounting plates are sandwiched between the hubs 55 and 56 and are held in place by the screws 57.

To reduce the turbulence at the center portion of the sensor 45, a portion of each of the hubs 55 and 56 preferably is formed with a frustoconical external shape as shown in FIGS. 3 and 4. In addition, conical nose caps 71 and 72 are telescoped into and are bonded to the hubs 55 and 56 and blend smoothly with the frustoconical surfaces of the hubs. The conical cap 71 streamlines the flow of air approaching the sensor 45 while the conical cap 72 makes the sensor symmetrical and enables the sensor to be installed in either direction in the duct 13.

Part of a modified sensor 45' is shown in FIG. 5 in which elements corresponding to the elements of the sensor 45 are indicated by the same but primed reference numerals. The sensor 45' is characterized by the simple and inexpensive construction of the blades 66' and by the ability by which the blades may be easily made of different lengths and widths.

As shown in FIG. 5, the blade 66', instead of being flat, includes two grooved ribs 77 and 78 for receiving the sensing tubes 47' and 48', respectively. The two ribs are located between two oppositely extending flat portions 66a and 66b which define the air-shaping areas of the blade 66'. The blade 66' with the ribs 77 and 78 and with the flat portions 66a and 66b may be extruded from aluminum or the like with the initially elongated extrusion being cut into individual pieces to form blades of any desired length. In addition, sensors for ducts of larger diameters require blades with flat airshaping portions 66a and 66b which are wider than those shown in FIG. 4. The extrusion as initially made may be formed with very wide flat portions suitable for large sensors and then those portions may be trimmed to width for smaller sensors. Thus, a single extrusion may be used to make blades of various lengths and widths.

The blade 66' is assembled simply by slipping the blade lengthwise between the tubes 47' and 48' until the inner end portion of the blade abuts the hubs 55' and 56'. The tubes fit into the grooved ribs 77 and 78 of the blade and captivate the blade against edgewise and broadwise movement. A bracket 80 is formed with holes 81 for receiving the outer ends of the tubes 47' and 48' with a snap fit and engages the outer end of the blade to hold the tubes and the blade in assembled relationship. The bracket also is formed with a center hole 82 for receiving a screw 68' for mounting the sensor 45' in the duct 13'.

As the diameter of the duct increases, the sensor most desirably should be provided with additional arms in order to insure that representative pressures are detected across the area of the duct. FIG. 6 shows a sensor 45a which is substantially identical to the sensor 45 except that the sensor 45a includes eight equally spaced arms 46a and is installed in a duct 13a of relatively large diameter.

The sensor also can be designed for use in ducts of rectangular cross-section. Such a sensor is indicated by the reference numeral 45b in FIG. 7 and includes eight arms 46b of such length that a rectangle may be circumscribed around the outer ends of the arms. The arms are alined with one another in pairs, there being a pair of arms extending along each center axis of the rectangle and there being a pair of arms extending along each diagonal of the rectangle. A rectangular band or frame 85 extends around the outer ends of the arms 46b and includes brackets 86 by which the arms may be secured to the frame. Two sensor modules 45b of the type shown in FIG. 7 may be stacked either vertically or side-by-side in a large rectangular duct. In such an instance, the upstream and downstream averaging chambers of one module are connected in parallel with the upstream and downstream averaging chambers, respectively, of the other module.

FIG. 8 shows yet another arrangement where a rectangular sensor module 45c is located between two end modules 45d. Each end module is formed by a semi-circular section and by a rectangular section, there being a frame 87 extending around the modules to hold the latter in assembled relationship. The arrangement shown in FIG. 8 is adapted for installation in an oval duct. Again, the corresponding averaging chambers of the modules are connected in parallel with one another.

I claim:

1. A sensor for producing a differential pressure signal which varies as a function of the volumetric flow rate of air through a duct system having interconnected upstream and downstream duct sections extending at an angle to one another whereby air flows into the upstream end portion of the downstream duct section in an asymmetrical pattern, said sensor being located in the upstream end portion of said downstream duct section and comprising an array of at least three angularly spaced and radially extending arms, each of said arms comprising an upstream sensing tube and further comprising a downstream sensing tube alined angularly with and extending parallel to said upstream sensing tube, a series of ports spaced axially along and formed through each sensing tube, the ports in each upstream sensing tube being formed through the upstream side thereof whereby a high pressure signal is transmitted through such ports and to each upstream tube, the ports in each downstream tube being formed through the downstream side thereof whereby a low pressure signal is transmitted through such ports and to each downstream tube, means defining a first averaging chamber located at and communicating with said upstream tubes whereby the high pressure signals transmitted to such tubes are averaged within said chamber thereby to create an averaged high pressure signal, means defining a second averaging chamber located at and communicating with the inner ends of said downstream tubes whereby the low pressure signals transmitted to the downstream tubes are averaged within said second chamber thereby to create an averaged low pressure signal, and means for conducting the averaged high and low pressure signals from said first and second averaging chambers, respectively.

2. A sensor as defined in claim 1 in which the axial spacing between the ports of each of said tubes decreases as said ports progress outwardly along the tube.

3. A sensor as defined in claim 1 further including a blade located between and extending along the upstream and downstream sensing tubes of each of said arms, each of said blades being disposed in a plane extending substantially perpendicular to the direction of air flow and having side edges which project beyond the sides of said tubes whereby air flowing past each upstream tube is deflected by the associated blade and flows across the side edges thereof before flowing past the associated downstream tube.

4. A sensor as defined in claim 3 in which each of said blades comprises oppositely facing grooved ribs for receiving the upstream and downstream sensing tubes of the respective arm, each of said blades further including flat portions formed integrally with and extending in opposite directions from said grooved ribs.

5. A sensor as defined in claim 1 in which said means which define said first averaging chamber comprise a hollow and substantially conical member whose peak points in an upstream direction.

6. A sensor as defined in claim 5 in which said means which define said second averaging chamber comprise a hollow and substantially conical member whose peak points in a downstream direction.

7. A sensor as defined in claim 1 in which all of said arms are of equal length, said arms being spaced equally from one another.

8. A sensor as defined in claim 1 which includes eight arms of such length that a rectangle may be circumscribed around the outer ends of the arms, said arms being alined with one another in pairs, there being a pair of arms extending along each center axis and along each diagonal of the rectangle.

9. A sensor as defined in claim 1 further including a mounting frame extending around the outer ends of said arms, the outer ends of said arms being connected to said mounting frame.

10. A sensor as defined in claim 1 further including brackets on the outer ends of said arms, each of said brackets having a hole for receiving a fastener for securing said sensor within said downstream duct section.

11. A sensor for producing a differential pressure signal which varies as a function of the volumetric flow rate of air through a duct system having interconnected upstream and downstream duct sections extending at an angle to one another whereby air flows into the upstream end portion of the downstream duct section in an asymmetrical pattern, said sensor being located in the upstream end portion of said downstream duct section and comprising an array of at least three angularly spaced and radially extending arms, each of said arms comprising an upstream sensing tube and further comprising a downstream sensing tube alined angularly with and extending parallel to said upstream sensing tube, a blade located between and extending along the upstream and downstream tubes of each of said arms, each of said blades being disposed in a plane extending perpendicular to the direction of air flow and having side edges which project beyond the sides of said tubes whereby air flowing past each upstream tube is deflected by the associated blade and flows across the side edges thereof before flowing past the associated downstream tube, a series of ports spaced axially along and formed through each sensing tube, the ports in each upstream sensing tube being formed through the upstream side thereof whereby a high pressure signal is transmitted through such ports and into each upstream tube, the ports in each downstream tube being formed through the downstream side thereof whereby a low pressure signal is transmitted through such ports and into each downstream tube an upstream hub receiving the inner ends of said upstream tubes and having a hollow interior defining a first averaging chamber communicating with said upstream tubes whereby the high pressure signals transmitted to such tubes are averaged within said chamber thereby to create an averaged high pressure signal, a downstream hub receiving the inner ends of said downstream tubes and having a hollow interior defining a second averaging chamber communicating with the inner ends of said downstream tubes whereby the low pressure signals transmitted to the downstream tubes are averaged within said second chamber thereby to create an averaged low pressure signal, and means for conducting the averaged high and low pressure signals from said first and second averaging chambers, respectively.

* * * * *